(12) United States Patent
Gerdes et al.

(10) Patent No.: US 12,511,379 B2
(45) Date of Patent: Dec. 30, 2025

(54) METHOD AND DEVICE FOR IDENTIFYING MALICIOUS SERVICES IN A NETWORK

(71) Applicant: Siemens Aktiengesellschaft, Munich (DE)

(72) Inventors: Florian Gerdes, Erlangen (DE); Christian Hahn, Höchstadt a.d. Aisch (DE); Wenlong Zhang, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 349 days.

(21) Appl. No.: 17/919,444

(22) PCT Filed: Apr. 14, 2021

(86) PCT No.: PCT/EP2021/059677
§ 371 (c)(1),
(2) Date: Oct. 17, 2022

(87) PCT Pub. No.: WO2021/213862
PCT Pub. Date: Oct. 28, 2021

(65) Prior Publication Data
US 2023/0153429 A1    May 18, 2023

(30) Foreign Application Priority Data
Apr. 20, 2020   (EP) .................................... 20170304

(51) Int. Cl.
*G06F 21/55*   (2013.01)

(52) U.S. Cl.
CPC ...... *G06F 21/554* (2013.01); *G06F 2221/033* (2013.01)

(58) Field of Classification Search
CPC . H04L 63/1425; H04L 63/1416; H04L 47/20; H04L 41/50; H04L 63/0869;
(Continued)

(56) References Cited

U.S. PATENT DOCUMENTS 8,843,750 B1 * 9/2014 Sokolov ............... H04L 63/0823
713/175
10,389,753 B2 * 8/2019 Kawashima .......... H04L 63/101
(Continued)

OTHER PUBLICATIONS

Giaretta, A.; Dragoni, N.; Massacci, F. IoT Security Configurability with Security-by-Contract. Sensors 2019, 19, 4121. https://doi.org/10.3390/s19194121 (Year: 2019).*
(Continued)

*Primary Examiner* — Tod R Swann
*Assistant Examiner* — Amir Mahdi Hajiabbasi
(74) *Attorney, Agent, or Firm* — Slayden Grubert Beard PLLC (57) ABSTRACT

Various embodiments of the teachings herein include a method for identifying/detecting non-qualified services in a network of distributed services. In some embodiments, the method includes: detecting comparative interaction patterns between at least two services in a contract; observing interaction patterns during the communication of the services; and comparing the observed interaction patterns with the comparative interaction patterns.

11 Claims, 5 Drawing Sheets

(58) Field of Classification Search
CPC ... H04L 9/3268; H04L 9/321; H04L 67/1046; H04L 9/006; H04L 9/08; H04L 9/3263; G06F 21/554; G06F 2221/033; G06F 21/64; G06F 21/645; G06F 21/44; G06F 21/6209; H04W 12/08; H04W 48/16; H04W 12/06; H04W 41/0806; G06Q 20/3829; G16Y 30/10; G16Y 30/00
See application file for complete search history.

(56) References Cited

U.S. PATENT DOCUMENTS

| | | | | |
|---|---|---|---|---|
| 11,552,954 | B2* | 1/2023 | Zou | H04L 63/0263 |
| 11,799,630 | B2* | 10/2023 | Zhang | G06F 21/64 |
| 2003/0220883 | A1* | 11/2003 | Block | G06F 21/10 |
| | | | | 705/59 |
| 2004/0103299 | A1* | 5/2004 | Zimmer | G06F 9/4416 |
| | | | | 713/193 |
| 2005/0257045 | A1* | 11/2005 | Bushman | H04L 63/12 |
| | | | | 713/156 |
| 2007/0294672 | A1* | 12/2007 | Mosuoka | G06Q 10/06 |
| | | | | 717/126 |
| 2008/0208779 | A1* | 8/2008 | Driscoll | G06Q 50/205 |
| | | | | 706/14 |
| 2012/0131181 | A1* | 5/2012 | Birkler | H04L 43/08 |
| | | | | 709/224 |
| 2013/0097663 | A1* | 4/2013 | Finger | G06F 21/51 |
| | | | | 726/1 |
| 2017/0302663 | A1* | 10/2017 | Nainar | H04L 63/123 |
| 2018/0196945 | A1* | 7/2018 | Kornegay | G06F 21/57 |
| 2018/0212768 | A1 | 7/2018 | Kawashima | |
| 2019/0349254 | A1* | 11/2019 | Nolan | G06F 16/1834 |
| 2021/0037053 | A1* | 2/2021 | Noon | H04L 63/126 |

OTHER PUBLICATIONS

Search Report for International Application No. PCT/EP2021/059677, 19 pages, Jul. 21, 2021.
Search Report for EP Application No. 20170304.8, 7 pages, Oct. 13, 2020.
Pan, Jianli et al: "EdgeChain: An Edge-IoT Framework and Prototype Based on Blockchain and Smart Contracts"; IEEE Internet of Things Journal; IEEE; USA; Bd. 6; Nr. 3; pp.: 4719-4732; XP011731303; DOI: 10.1109/JIOT.2018.2878154, Jun. 1, 2019.
Giaretta, Alberto et al: "Protecting the Internet of Things with Security-by-Contract and Fog Computing"; 2019 IEEE 5th World Forum on Internet of Things (WF-IOT); IEEE; pp.: 1-6; XP033578641; DOI: 10.1109/WF-IOT.2019.8767243, Apr. 15, 2019.
Duan, Li et al: "A Comprehensive Security Framework for Publish/Subscribe-Based IoT Services Communication"; IEEE Access; Bd. 7, p. .: 25989-26001; XP011713196; Doi: 10.1109/ACCESS.2019.2899076, Feb. 12, 2019.

* cited by examiner

METHOD AND DEVICE FOR IDENTIFYING MALICIOUS SERVICES IN A NETWORK

CROSS-REFERENCE TO RELATED APPLICATIONS

This application is a U.S. National Stage Application of International Application No. PCT/EP2021/059677 filed Apr. 14, 2021, which designates the United States of America, and claims priority to EP Application No. 20170304.8 filed Apr. 20, 2020, the contents of which are hereby incorporated by reference in their entirety.

TECHNICAL FIELD

The present disclosure relates to networks. Various embodiments include computer-aided methods and/or systems for detecting non-qualified services in a network of distributed services.

BACKGROUND

An ever-increasing number of tasks are performed by networks of distributed services. These are for example what are known as IoT environments. The tasks of such networks are highly varied: Storage and processing of user data (for example Google Analytics), storage and processing of health data (for example HIS, RIS, PACS), control of (public) infrastructure (for example traffic control in cities, energy distribution), protection of passenger health (for example flight safety, train safety), control of industrial installations (for example discrete manufacturing, process engineering), control of energy production installations (for example conventional power plants, nuclear power plants, hybrid power plants).

Each subscriber in such a network may offer (one or more) services and use services offered by other subscribers. A subscriber may be for example a computer system, a component of a computer system, software in the sense of a service, or a software component.

These networks are typically distributed, meaning that the subscribers may be located anywhere. The subscribers generally communicate with one another via physical or digital communication channels. Many of these networks are open, meaning that new services or subscribers may join the network at any time. Some of these networks are also decentralized, meaning that there is no central management of services or subscribers. What are known as mal(-behaved) services, that is to say malicious services, may be introduced into such networks relatively easily. These malicious services are intruders and may occur in different guises; for example, the software of a service may be modified by way of a worm, Trojan horse or manual intervention, making the service itself an intruder. Or an intruder exploits the openness of a network to simply join it as a service. In addition, untrustworthy services may already be installed at the time when the network is created.

An intruder does not necessarily impair the functionality of a service or of the entire network through its behavior, but often primarily the quality is reduced, which means that the change is not noticed or is noticed only with a delay. The essential quality of a network lies for example in its (information) security, integrity, safety and availability, in its reliability and its expediency. If a network no longer performs its task, or no longer performs it in a suitable manner and with suitable quality, the user of this network suffers direct damage, for example loss of time due to unavailability of services, loss of data due to unsaved data that was lost when a service crashed, third parties accessing sensitive personal data such as passwords or medical data. This may lead to people being injured or even killed if, for example, safety mechanisms have been deactivated or sensitive system settings have been changed.

A network operator may for instance suffer direct damage through penalties, increased costs, damage to reputation and/or sanctions. A manufacturer of networks and/or network components would accordingly suffer indirect damage, for example through recourse claims, costs, for example for fixing, damage to reputation, loss of customers and/or market share and/or through sanctions.

Until now, malicious services have been denied access to networks via access regulations such as certificates, authentications and authorizations. Common approaches in this regard work with passwords, symmetric authentication with and without cryptography, cryptographic methods or, for example, IP/MAC whitelisting. A high level of administration effort is required for these methods, and there is a high demand for computing time during uptime, that is to say during any communication. There is also the risk that the secret will be spied out and of unauthorized services thus being able to access it. Once an intruder has the access data, it is able to access all of the services in the network.

SUMMARY

Teachings of the present disclosure provide improved technical means and an improved technical method by way of which malicious services are able to be kept away from networks. For example, some embodiments include a computer-aided method comprising identifying/detecting non-qualified services in a network of distributed services, comprising agreeing comparative interaction patterns between at least two services (CApp, PApp) in a contract (C), observing (O) interaction patterns during the communication of the services (CApp, PApp) and comparing (M) the observed interaction patterns with the comparative interaction patterns.

In some embodiments, the comparative interaction patterns are taken from the required tests (T) during the build time (t_b).

In some embodiments, the method further comprises reporting (2.12b. 3.8b) a service (CApp, PApp) detected as non-qualified to the administrator and/or excluding a service detected as non-qualified from the network of distributed services.

In some embodiments, a service (CApp, PApp) observes (0) a communication (req, res) that it maintains with another service (PApp, CApp).

In some embodiments, the method further comprises comparing (M) the observed communication (req, res) from another service with the contract/the contract specification (C).

In some embodiments, in order to add a further service (CApp, PApp) to an existing network of distributed services, the contracts (C) relating to this further service are signed and/or cryptographically secured and made accessible to all verification subsystems of the network.

In some embodiments, the signature and/or cryptographic security are implemented with a private key (priv).

In some embodiments, the secrets are maintained in a securable build time environment and are not available in the open runtime environment.

As another example, some embodiments include a computer system having an execution environment for at least one service of a consumer and/or provider (CApp, PApp), integrated in a network of distributed services as a certified subscriber such that it is able to communicate with at least one further computer system and has access to at least one memory unit containing a contract repository (CR) in which contracts (C) containing comparative interaction patterns are provided, wherein the computer system has at least one data connection to an observer (O) that is designed to record observation data on interaction patterns during the communication (req, res) with the further computer system, wherein the computer system has at least a direct data connection to an interface (cl) and/or an indirect data connection to an interface (cl) via the observer (O) and a direct data connection to a gate (G) via a forwarder (F) of the gate (G) and an indirect data connection to the gate (G) via the observer (O) and a matcher (M) or via the observer, a matcher (M) and the interface (cl), wherein the matcher (M) is designed to request keys (key) required for a comparison from a certified authority (CA) in order to access signed and/or cryptographically secured contracts (C) in the contract repository (CR) and select, from these, contracts (C) that match the interaction patterns of the observed communication (req, res).

In some embodiments, the components observer (O), matcher (M), gate (G), contract repository (CR) and encoder (E) are implemented in a verification subsystem between a service and an interface (cl), wherein the verification subsystem in particular has the same application interface as the interface (cl).

As another example, some embodiments include a distributed network comprising at least a first certified subscriber or a first certified service of a subscriber, consumer and/or provider (CApp, PApp), comprising at least a second certified subscriber and/or a second certified service (CApp, PApp) that communicates with the first service, comprising at least one memory unit containing a contract repository (CR) that provides contract specifications (C) containing comparative interaction patterns, wherein the network has at least one data connection of the first service (CApp, PApp) to an observer (O), which is designed to record observation data on interaction patterns during the communication (req, res) with the second service, wherein the network has at least a direct data connection of the first service to an interface (cl) and/or an indirect (data) connection of the first service to an interface (cl) via the observer (O) and a direct data connection of the first service to a gate (G) via a forwarder (F) of the gate (G) and an indirect data connection of the first service to the gate (G) via the observer (O) and a matcher (M) or via the observer (O), a matcher (M) and the interface (cl), wherein the matcher (M) is designed to request keys (key) required for a comparison from a certified authority (CA) in order to access signed and/or cryptographically secured contracts (C) in the contract repository (CR) and select, from these, contracts (C) that match the interaction patterns of the observed communication (req, res).

In some embodiments, the network is open to the joining of new subscribers and/or services (CApp, PApp).

In some embodiments, the network has a decentralized structure.

As another example, some embodiments include a computer program product, which is able be loaded directly into a memory of a programmable processing unit of a computer system, containing program code means for carrying out a method as described herein when the computer program product is executed in the processing unit of a computer system.

In some embodiments, the provision device stores and/or provides the computer program product.

BRIEF DESCRIPTION OF THE DRAWINGS

Examples and embodiments of the teachings of the present disclosure will be described by way of example with reference to FIGS. 1 to 5 of the appended drawings.

DETAILED DESCRIPTION

Some embodiments of the teachings herein include a computer-aided method for detecting non-qualified services in a network of distributed services, comprising agreeing comparative interaction patterns between at least two services in a contract, observing interaction patterns during the communication of the services and comparing the observed interaction patterns with the comparative interaction patterns. Non-compliant behavior of malicious services is thus detected by comparing expected and actually observed interaction patterns. Additional authentication and authorization mechanisms, with all their disadvantages, are thus no longer necessary for identifying intruders or what are known as mal services.

In this disclosure, a network of distributed services means a net, network or generally a communication system in which at least two subscribers, services or communication partners cooperate or communicate. A service is in this case implemented by software. A service is a computer-aided method. This service may run on multiple subscribers. Multiple services may also be executed on one subscriber.

An interaction pattern means measurable characteristics of an interaction, cooperation or generally communication between two subscribers, services or communication partners in a network. A contract may be understood to mean a contract, an agreement, a comparison template, a contract specification, etc. The contract repository may be implemented in a centralized or distributed manner. As an alternative to contract specifications, it is possible to use any file in which the agreed and/or observed interaction patterns are documented reliably and in an abstract manner. The comparison between the observed interaction patterns and the contracts may also be carried out step by step, for example first the comparison of a request and then the comparison of a response. In this disclosure, "qualified" means "acting according to contract".

In some embodiments, the comparative interaction patterns are taken from the required tests during the build time. Build time is the time from the start of initial work on a service to completion thereof. It is assumed here that there is no overlap between build time and runtime. The runtime begins at the time of first use of the service in a network.

The management effort may be very low, since the services do not have to be managed individually. The contract specification arises as a by-product of the build, as it were. Contracts between two services may be agreed separately. However, they may be generated, very efficiently, automatically during the build time of the service software. For example, the contracts may arise through the contract tests. Once the network has finished being built, the finished contracts may be encrypted and stored in a contract repository. Then, new contracts are or may be introduced through a uniform mechanism.

In some embodiments, a service detected as non-qualified is reported to the administrator and/or a service detected as non-qualified is excluded from the network of distributed services.

In some embodiments, a service observes a communication that it maintains with another service. Communication is understood in this case to mean requests, as they are known, and responses. The observation itself is performed by an observer. Said observer is in particular upstream of the service. The observation is initiated by communication of the service. The observer software component is in particular part of the verification subsystem.

In some embodiments, said method comprises comparing the observed communication from another service with the contract. If no matching contract is found for an observed communication through the syntactic comparison, then the other service definitely exhibits a behavior; the other service is thereby reliably detected as an intruder. If at least one matching contract is found, then this means that the other service behaved according to contract in the observed communication; this is not proof that it is an intruder or is not an intruder. The only thing that is clear is that the service behaved according to contract and therefore syntactically correctly in every compared communication.

In some embodiments, in order to add a further service to an existing network of distributed services, the contracts relating to this further service are signed and/or cryptographically secured and made accessible to all verification subsystems of the network. The manufacturer or operator of the service is in particular responsible for the signature. The addition of a new service to the network is therefore first preceded by generation of a contract in accordance with the procedure described above, and then encryption and distribution. The verification subsystem includes all of the software components observer, matcher, gate, contract repository and encoder. The associated method steps are accordingly combined in the verification stage.

The signature and/or cryptographic security may be implemented for example with a private key. In some embodiments, all security methods that are able to guarantee the authenticity and integrity of the contracts may be used.

In addition, the integrity of the contract repository must always be guaranteed. By way of example, the secrets are for this purpose kept in a securable build time environment and are not available in the open runtime environment.

The methods described herein may additionally have the advantages that it is possible to identify malicious services in unprotected networks, for example free-to-join environments.

In some embodiments, a computer system has an execution environment for at least one service of a consumer and/or provider, and is also integrated in a network of distributed services as a certified subscriber such that it is able to communicate with at least one further computer system and has access to at least one memory unit containing a contract repository in which contracts containing comparative interaction patterns are provided, wherein the computer system has at least one data connection to an observer that is designed to record observation data on interaction patterns during the communication with the further computer system, wherein the computer system has at least a direct data connection to an interface and/or an indirect data connection to an interface via the observer and a direct data connection to a gate via a forwarder of the gate and an indirect data connection to the gate via the observer and a matcher or via the observer, a matcher and the interface, wherein the matcher is designed to request keys required for a comparison from a certified authority in order to access signed and/or cryptographically secured contracts in the contract repository and select, from these, contracts that match the interaction patterns of the observed communication.

In some embodiments, the gate comprises an escalator that is designed to generate a warning notification and/or to exclude the malicious service.

The computer system is thus in particular a network subscriber. A matcher means a software component, for example a comparison function that compares, in particular, interaction patterns. The gate, request or response gate denotes a software component that makes a decision based on predefinable criteria. The contract repository may be designed in a centralized or decentralized manner. What is crucial is that each subscriber and/or service has access to the contract repository.

In some embodiments, there is a computer system as described above, wherein the components observer, matcher, gate, contract repository and encoder are implemented in a verification subsystem between at least one service and the interface, which verification subsystem has the same application interface as the interface. In some embodiments, only one verification subsystem is required per interface. The verification subsystem may for example form a layer or be contained in a layer. This may be provided by a provider service or by a consumer service.

However, it is also possible for both services to have a verification subsystem on their respective side of the interface. Such a variant may for example have a respective verification subsystem as described above between each network subscriber and the interface. In some embodiments, all of the verification subsystem components observer, matcher, gate, contract repository and encoder may also be implemented in a software component of the respective services or of the respective subscribers, for example different computer systems in the network.

This makes the method completely transparent to the apps. The method works for all apps from all sources. In solutions previously known from the prior art, the apps have to be specially prepared, for example through password inspection, checking tokens or certificates; apps without this cannot subscribe.

In some embodiments, a distributed network comprises at least a first certified subscriber or a first certified service of a subscriber, consumer and/or provider, and also has at least a second certified subscriber and/or a second certified service that communicates with the first service, and at least one memory unit containing a contract repository that provides contract specifications containing comparative interaction patterns. The network furthermore has at least one data connection of the first service to an observer, which is designed to record observation data on interaction patterns during the communication with the second service. The network furthermore has at least a direct data connection of the first service to an interface and/or an indirect data connection of the first service to an interface via the observer and a direct data connection of the first service to a gate via a forwarder of the gate and an indirect data connection of the first service to the gate via the observer and a matcher or via the observer, a matcher and the interface, wherein the matcher is designed to request keys required for a comparison from a certified authority in order to access signed and/or cryptographically secured contracts in the contract repository and select, from these, contracts that match the interaction patterns of the observed communication. In some embodiments, the described distributed network is open to the joining of new subscribers and/or services.

In some embodiments, the distributed network has a decentralized structure in accordance with one of the above descriptions.

In some embodiments, a computer program product may be loaded directly into a memory of a programmable processing unit of a computer system described above and has program code means for carrying out one or more methods as described herein when the computer program product is executed in the processing unit of the computer system. The computer program product may be a computer program or may comprise a computer program.

The methods may thereby be carried out quickly and in an identically repeatable and robust manner. The computer program product is configured such that it is able to carry out the method by way of the processing unit. The processing unit may in this case satisfy the respective requirements, such as for example an appropriate main memory, an appropriate graphics card or an appropriate logic unit, so that the respective method steps are able to be carried out efficiently.

In some embodiments, the computer program product is stored on a computer-readable medium or stored on a network or server, from where it may be loaded into the processor of a local processing unit, which may be connected directly to the computer system or formed as part of the computer system. Control information of the computer program product may furthermore be stored on an electronically readable data carrier. The control information of the electronically readable data carrier may be designed such that, when the data carrier is used, it carries out a method according to the invention in a processing unit of the computer system. The computer program product may thus also constitute the electronically readable data carrier. Examples of electronically readable data carriers are a DVD, a magnetic tape, a hard disk or a USB stick on which electronically readable control information, in particular software (see above), is stored. If this control information (software) is read from the data carrier and stored in a controller and/or processing unit of the computer system, all of the embodiments, according to the invention, of the methods described above may be carried out. The invention may thus also proceed from said computer-readable medium and/or said electronically readable data carrier.

In some embodiments, there is a provision device for storing and/or providing the computer program product. The provision device is for example a data carrier that stores and/or provides the computer program product. In some embodiments, the provision device is for example a network service, a computer system, a server system, in particular a distributed computer system, a cloud-based computer system and/or virtual computer system that stores and/or provides the computer program product preferably in the form of a data stream.

This provision takes place for example as a download in the form of a program data block and/or command data block, e.g. as a file, in particular as a download file or as a data stream, in particular as a download data stream, of the complete computer program product. This provision may however also take place for example as a partial download that consists of multiple parts and is downloaded in particular via a peer-to-peer network or provided as a data stream. Such a computer program product is for example read into a system using the provision device in the form of the data carrier and executes the program instructions such that one or more of the methods described herein is executed on a computer or configures the creation device such that it creates the security module and/or the configuration device and/or the component and/or the authentication system.

The teachings herein may yield particularly great advantages in connection with cloud-to-edge and IoT applications: Securing communication does not cause a footprint on the edge devices and may also be applied in installations containing hundreds or thousands of edge devices. No management overhead arises.

Furthermore, it is possible to increase the acceptance of digital offers since there is no increased effort for securing the customer's network, which is open to the Internet, and the customer's network is secured despite the openness.

Computer-aided, computer system, etc.: Unless stated otherwise in the following description, the terms "carry out", "calculate", "provide", "computerized", "computer-aided", "compute", "determine", "generate", "configure", "reconstruct" and the like preferably relate to operations and/or processes and/or processing steps that change and/or generate data or data packets and/or convert data into other data, wherein the data may be represented or be present in particular in the form of physical variables, for example in the form of electrical pulses.

The expression "computer system" should in particular be interpreted as broadly as possible in order in particular to cover all electronic devices having data processing properties. Computer systems may include computers, processors or computer systems. Computer systems may thus for example include personal computers, servers, hand-held computer systems, pocket PC devices, mobile radio devices and other communication devices that are able to process data in a computer-aided manner, processors and other electronic data processing devices. Computer systems may thus for example also be clusters, virtual computers, such as clouds for instance, data processing systems or modules in general right through to mini single-circuit-board computers or embedded systems, as they are known, or devices, and also edge devices or controllers with a software execution environment.

In connection with the current disclosure, "computer-aided" means for example an implementation of the method in which in particular a processor carries out at least one method step of the method.

Component: a component includes an assembly, a software component or a hardware component of a device, in particular a BIOS controller of a motherboard, a sensor, a data memory or a network card. A component also includes for example devices of an installation, for example a generator, a field device or a controller. The components may be in particular components that are each spatially separate from one another, for example a network card, a BIOS controller of the motherboard or a main memory of a computer.

Device or system: A (technical) device, for example devices or apparatuses in a factory 82-86, may include a measuring device for radiofrequency technology, a measuring device, a receiver of a satellite communication station, a field device of a power plant.

A (technical) system, for example computer system 100, data memory 12, execution environment 14, may in particular also be understood to mean an embedded system.

The device or the system or one or more parts of the system, for example of the computer system 100, may for example also comprise a processor and/or a memory unit. The device or the system, or the one or more parts of the system, may also be a processor. A (technical) device or a (technical) system may also be understood to mean for example an IC (integrated circuit), an FPGA (field-programmable gate array), an ASIC (application-specific integrated circuit) or a DSP (digital signal processor).

Memory unit: a memory unit may include for example a memory in the form of main memory (random access memory, RAM) or a hard disk.

Subscriber (in a network), communication partner: a network subscriber, subscriber in a network communication or communication partner may include a service, an application, software or a software component that is able to communicate in a network. A network subscriber or subscriber in a network communication may also be understood to mean a computer system, a workstation, a field device or measuring device, a server or a client. The network subscriber or subscriber may for example use network communication via a network in order to communicate with other network subscribers and in particular exchange data or data packets in the process. By way of example, a first communication partner may authenticate itself to a second communication partner by way of a certificate.

Data Connection: a connection type may include for example a direct physical connection via a LAN ("Local Area Network") or a virtual network connection.

Network communication: network communication may include communication between subscribers in a computer network. Network communication may be understood in particular to mean connection-oriented, in particular TCP/IP-based network communication, or connectionless communication, in particular UDP-based network communication.

Interface: an interface may include an IoT communication layer or network communication layer.

Layers: a layer or layers of network communication may include a layer in accordance with the OSI model, the TCP/IP model or another communication model.

Protocol: a protocol or a communication protocol may include a network protocol that may be used for communication between network subscribers. Examples of this are the TCP/IP protocol or the IPX/SPX protocol.

Data diode: a data diode may include a unidirectional security gateway or a unidirectional network or unidirectional network communication. The data diode may for example ensure that data is thereby transmitted only in one direction. This may mean for example that data (packets) are transmitted from a transmitter to a specific network subscriber, for example, but the data diode in particular prevents data from being transmitted back to the transmitter from the network subscriber.

Data stream: a data stream may include for example the sending of information using multiple data elements. A data stream may for example be a video stream that is transmitted from a streaming server to one or more streaming clients using the UDP protocol. In this case, the individual UDP packets are in particular the data elements of the method according to the invention. A data stream may generally be formed by a sequence of data elements. By way of example, several or all data elements of the data stream in this case contain authentication information that relates to the respective data element and validation information that is assigned to authentication information of a previously transmitted data element and that may be used to check same. The protection of messages according to the invention may in particular be applied to all data elements in a data stream or to a predefined subset of the data elements in the data stream.

Data packet: a data packet may include for example an Ethernet frame, token ring frame, an IP packet or TCP segment. A data packet may contain payload data, which is preferably encrypted.

Secret, key: a secret, in particular including as a "secret in the form of a character string" or as a character string, may include for example license information, a cryptographic key, in particular a symmetric key or a private key of an asymmetric key pair. A key may also include for example a password for accessing license information or for accessing a cryptographic key. The key may be generated for example based on another security policy, which specifies for example a key length or a calculation algorithm for the key. In particular, the expressions "reconstructed secret" and "reconstructed character string" may be used synonymously in connection with the invention.

Checksum/check value: A checksum calculation function, a checksum function or a check value function for calculating a checksum or a check value may be implemented for example using a cryptographic function. The cryptographic function may be for example a one-way function, in particular the CRC16 ("Cyclic Redundancy Check 16") or the CRC32 ("Cyclic Redundancy Check 32") function. The checksum may be calculated for example using a processor and/or memory.

Policy: a security policy or a policy may include for example a security policy. The security policy may for example specify whether network communication should take place in encrypted form and/or the protocol levels of a used network protocol on which encryption should be used, and/or predefine specific network protocols for communication. The security policy may also for example predefine specific send addresses and/or specific send address ranges and/or receive addresses and/or receive address ranges.

Application: an "application" may include an executable file or else a program library.

Execution environment: an "execution environment" may include a virtual machine, for example a Java virtual machine, a processor or an operating system environment. The execution environment may be implemented on a physical processing unit (processor, microcontroller, CPU, CPU core). The application may in this case be executed in a learning mode and in an execution mode on the same physical processing unit. It is likewise possible for example for the application to be executed in a learning mode in another physical processing unit. For example, the training may thus take place in a special training processing unit. The execution in an execution mode takes place for example in a second processing unit, wherein the validity information ascertained during training is used during the execution in the execution processing unit. The validity information ascertained for example by the training processing unit is preferably provided in a manipulation-protected manner.

Program instructions: program instructions may include the program instructions that an application comprises as a whole, preferably including the libraries used.

Program component: a program component may include a software component containing program instructions that implement the method according to the invention.

Signature function: A signature calculation function or signature function for calculating a digital signature may be implemented for example using the DSA (Digital Signature Algorithm) or the ECDSA (Elliptic Curve Digital Signature Algorithm). The digital signature may be calculated for example using a processor and/or memory.

Match: By way of example, two contracts should be considered to be "substantially matching" if contract A matches contract B in terms of content. An insufficient match may be understood to mean that for example data bits of encrypted data of a data packet of a network communication do not satisfy statistical properties, in particular expected or predefined statistical properties, upon a statistical analysis. These statistical properties may be predefined for example by an encryption algorithm that is required by a security policy for the network communication. This may mean that the data bits of the payload data of the data packet should for example have a random statistical distribution in order to confirm that they are encrypted. If on the other hand the data bits have a non-random statistical distribution, they have, in particular, an insufficient match with predefined statistical properties. An insufficient match may however also be understood to mean that one or more requirements of a security policy placed on a network communication are not met.

Execution paths: execution paths may include sub-areas of the application that comprise multiple program instructions to be executed in direct succession and that are assigned in particular to a specific sub-functionality of the application. Execution paths may also be sub-areas that are executed depending on a condition, for example an if-else condition.

Random bits: random bits, a random bit sequence or a pseudo-random permutation may include randomly or pseudo-randomly distributed bit sequences.

On-the-fly: the term on-the-fly may be understood to mean that for example data packets are analyzed directly during processing in a network component. A network component may for example be a switch that routes a data packet to the port to which a receiver of the data packet is connected. A latency time when transmitting the data packet may not be increased in the process.

Real time: real time may be understood to mean that the analysis and/or the provision is reliably carried out within a predetermined period of time, for example in a fixed time frame. For network communication, this may mean that the analysis and/or the provision takes place within a period of time before the data packet has been transmitted to its destination, or without a significant increase in the transmission time of the data packet.

Without validity information: the term without validity information may be understood to mean that no validity information is assigned to a program instruction and/or to a subroutine/function and/or to a program library. If for example each program instruction is assigned a specific memory area in which the validity information is able to be stored, then, for a program instruction without validity information, this memory area may for example be occupied with zeros or another value that indicates that no validity information is available for this program instruction. The term without validity information may additionally be understood to mean that invalidity information is assigned to a program instruction.

Figure 1:
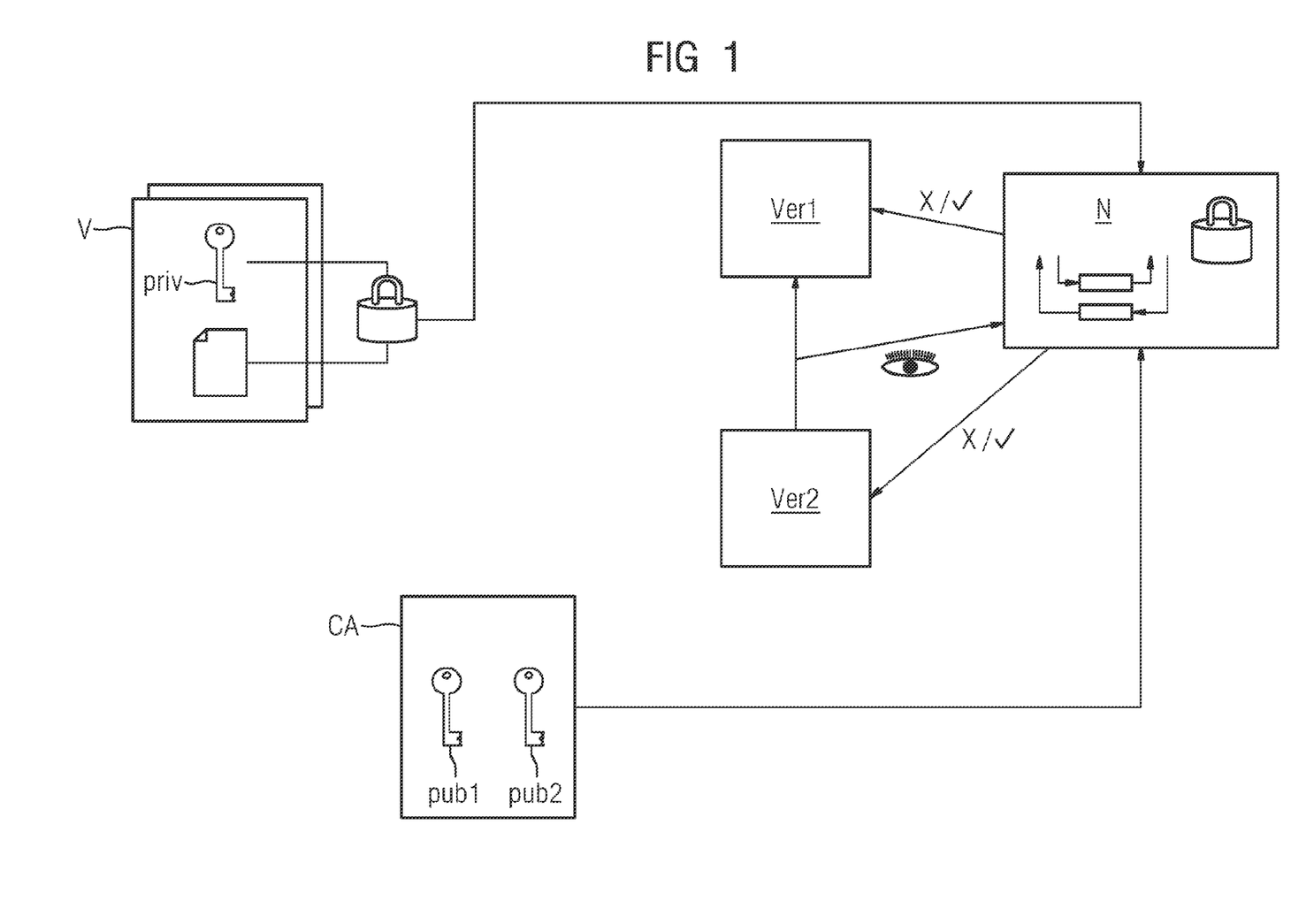
FIG. 1: A new subscriber joining a network

FIG. 1 shows a diagram representing a new user joining a network. If for example a service (app) is added to an existing network, for example an IoT (Internet of Things) network, then the manufacturer (vendor, V) of this service must sign all contracts (contracts, C) with its private key (private key, priv) and then send (send), to all verification subsystems (Ver) of the subscribers in the network, what is known as the trusted infrastructure, or make the contracts accessible thereto. Required public keys (public keys pub1+ pub2) are requested (req) from a certified authority (certified authority, CA).

A subscriber is for example a computer system that exchanges data with other subscribers via a network. A service is a computer-aided method. This service may run on multiple subscribers. Multiple services may also be executed on one subscriber. In connection with the patent application, computer systems and services may be understood to mean network subscribers.

Figure 2:
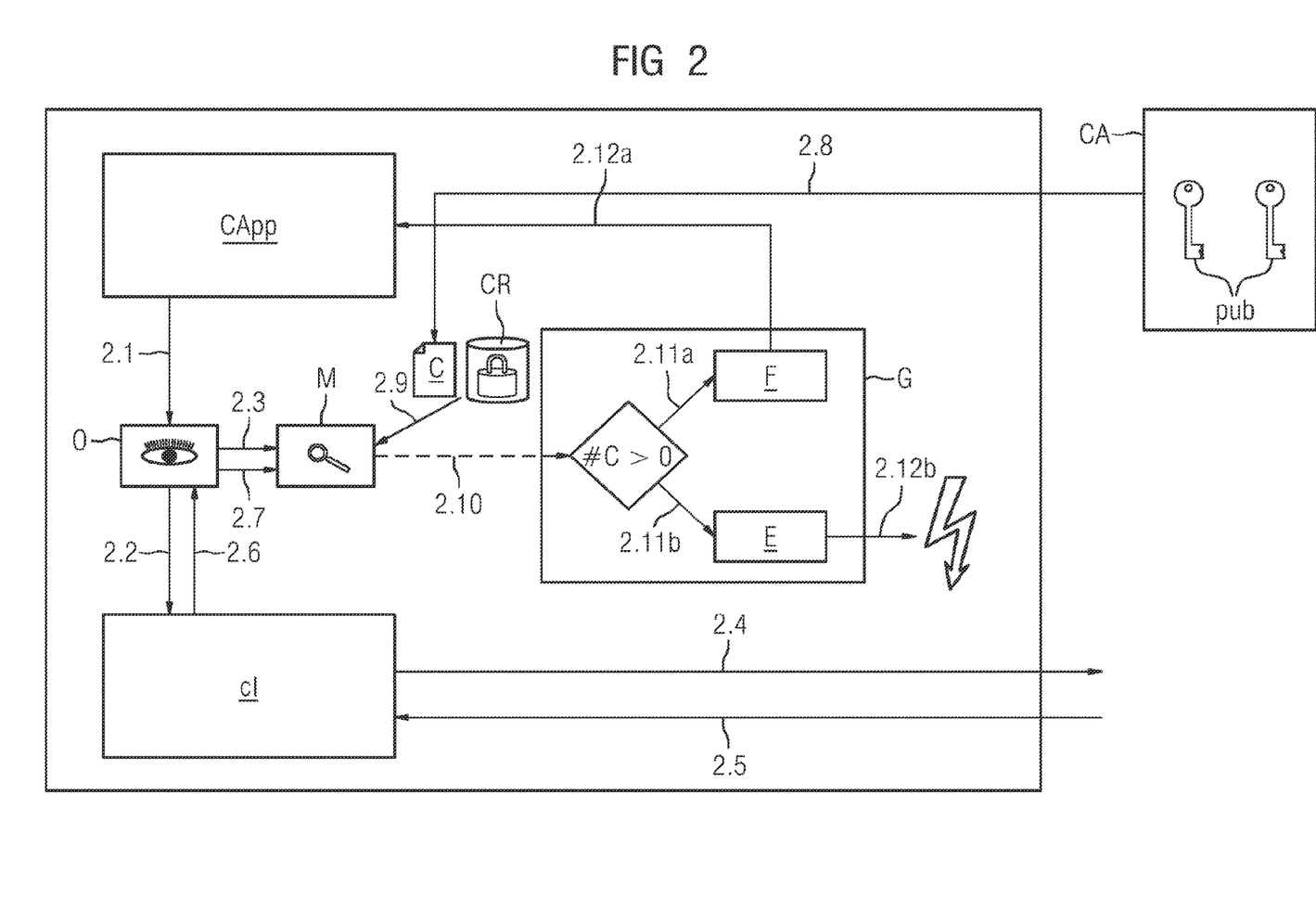
FIG. 2: Consumer-side verification

FIG. 2 represents consumer-side verification. Among the network subscribers, there are for example consumers (consumer, con) and providers (provider, pro). A consumer (con) wishes to protect itself by identifying a malicious provider service (PApp) in the network. In a first step (2.1), a service of a consumer (CApp) transmits a request (request, req) to the observer (O). As a second step (2.2), the observer (O) forwards the request (req) to the interface (cl). In parallel therewith, the request (req) is transmitted (2.3) to the matcher (m). This constitutes a core component of the system. The matcher (m) also stores the request (req) for further comparisons (checks, cf. steps 2.7, 2.8 and 2.9).

The request (req) is furthermore transmitted (send, 2.4) from the interface, that is to say the network communication layer (cl), to the provider (pro) and the response (response, res) from the provider (pro) returns to the interface (cl) (2.5). This response (res) is in turn then forwarded (2.6) from the interface (cl) to the observer (O). The observer (O) in turn forwards (2.7) the response (res) to the matcher (m). The matcher (m) requests (req, step 8) all of the required public keys (pub) from the certified authority (CA). The public keys (pub) are required to receive access (2.9) to the contracts (C) stored in encrypted form in the contract repository (contract repository, CR).

The matcher (M) selects the contracts (C) that match the request (req) and response (res). In step 2.10, the response (res) and the selected contracts (C), if any were found, are forwarded (2.10) to the response gate. If at least one matching contract (C) is found, the response (res) is transmitted to the forwarder (F), which forwards it (2.12a) to the consumer service (CApp). If no matching contract (C) is found, this is an indicator of a malicious provider service (PApp). The response (res) is then transmitted (2.11b) to the escalator (E), which for example generates a warning notification (2.12b) or silently excludes the malicious service from future communications.

All of the software components observer (O), matcher (M), gate (G), which may in particular comprise a request gate and/or response gate, contract repository (CR) and encoder (E) are connected to form a verification subsystem. The associated method steps are accordingly combined in the verification stage or the verification service.

Figure 3:
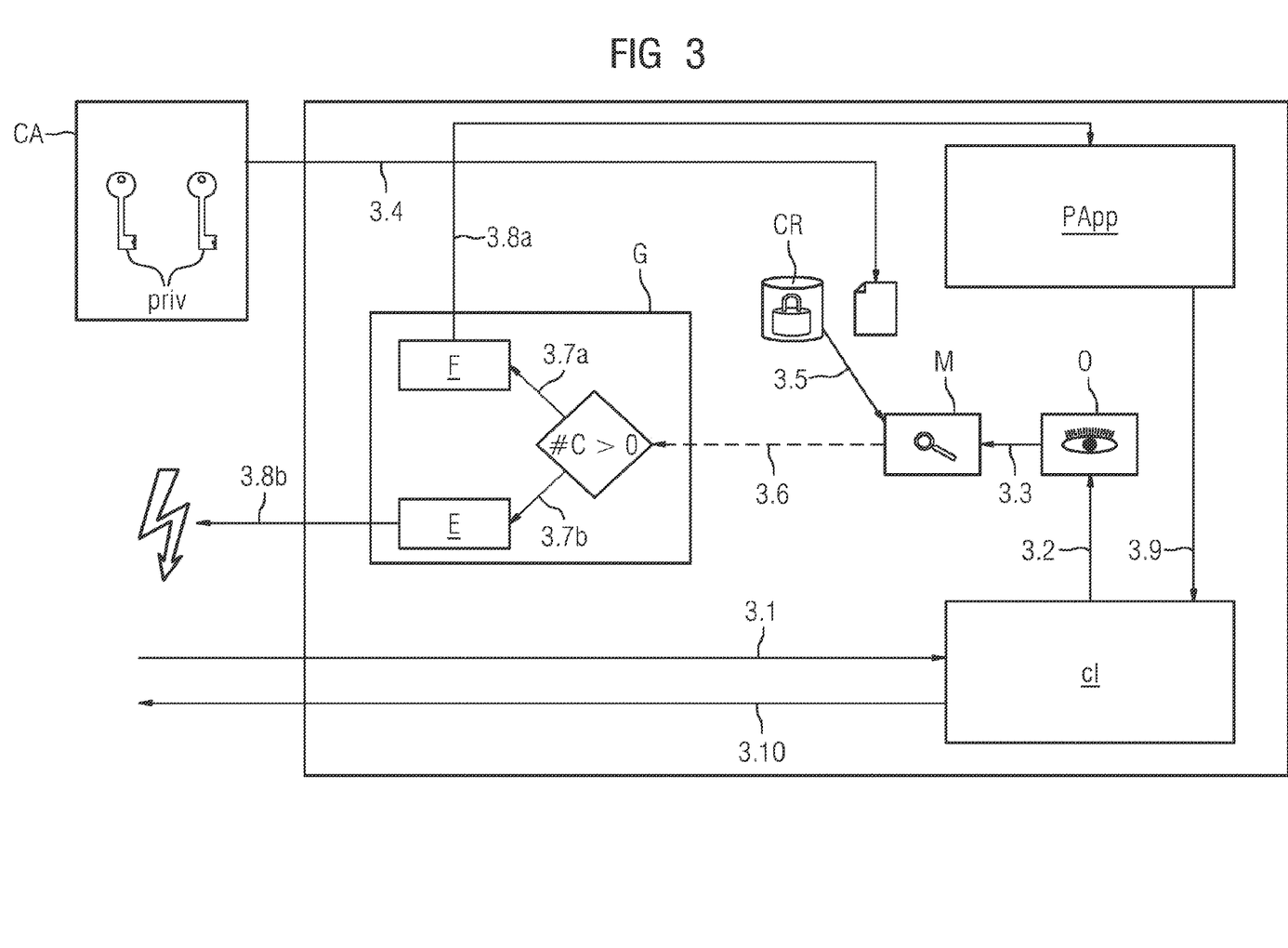
FIG. 3: Provider-side verification

FIG. 3 illustrates provider-side verification. Similarly, a malicious consumer service (CApp) may be identified. A request (req, 1) from a consumer service (CApp) is first received by the interface (cl). This request (req) is then forwarded (3.2) to the Observer (O). The observer (O) forwards (3.3) the request (req) to the matcher (M). The matcher (M) requests (3.4) all necessary public keys (pub) from the certified authority (CA). The matcher (M) then selects those contracts (C) from the contract repository (CR) that match the request (req), for which the public keys (pub) are necessary in order to decrypt (3.5) the contracts (C) stored in the contract repository (CR).

The request (req) and the selected contracts (C), if matching ones were found, are sent (3.6) to the request gate. If no matching contract (C) is found, this is an indicator of a malicious consumer service (CApp). The request (req) is then transmitted (3.7b) to the escalator (E), which generates a warning notification (3.8b) or silently excludes the malicious service from future communications. If at least one matching contract (C) is found, the request (req) is transmitted (3.7a) to the forwarder (F), which forwards it (3.8a) to the provider service (PApp). When the provider service (PApp) receives this request (req) from the forwarder (F), it transmits (3.9) its response (res) to the interface (cl), which forwards (3.10) the response (res) to the consumer service (CApp).

Figure 4:
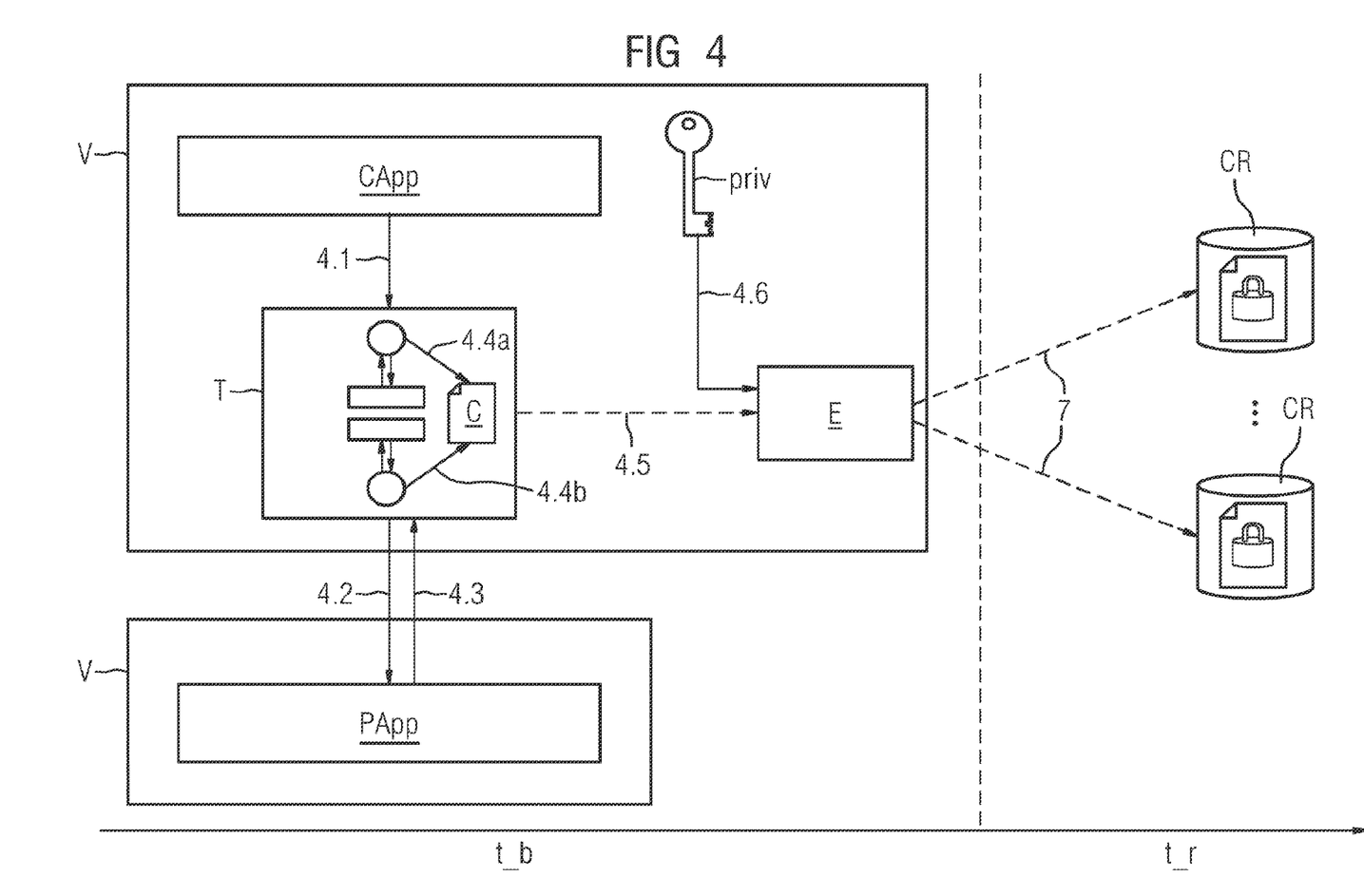
FIG. 4: Secure distribution and storage of contracts

FIG. 4 illustrates secure distribution and storage of contracts. The contracts (C) between provider (pro) and consumer (con) may be agreed separately, but they may also be generated, very efficiently, automatically during the build time (t_b) of the service software, for example via the contract tests. Once the network has finished being built, the finished contracts (C) are encrypted and stored in a contract repository (CR). This results in the advantage of very little management effort, since the introduction of new contracts takes place through a uniform mechanism, as described below. The services do not need to be managed individually.

Various procedures and measures during the build time (t_b) are illustrated on the left-hand side of FIG. 4, and the storage of the contracts (C) in the contract repositories (CR) is shown on the right-hand side of the graphic.

During the build time (t_b), a manufacturer (V) of a consumer service (CApp) initiates contract tests (T): The provider service (PApp) should be able to respond to any possible request (req, 4.1). For this purpose, the manufacturer (V) defines a contract (C) and creates a contract verification on the consumer side. A manufacturer (V) may for example also be a third-party manufacturer or an external provider of a network structure.

This is followed by a contract test (T), in which each request (req) is transmitted (4.2) to the responsible provider service (PApp) and the contract (C) is tested on the provider side. The result of each contract verification performed by the provider (pro) is sent back (4.3) to the manufacturer (V) of the consumer service (CApp). It is then checked whether the contract test (T) was successful on the part of the consumer (con) and whether all contract tests on the provider side were successful, and corresponding results are inserted (4.4a and 4.4b) into the contract (C).

If all tests (T) were successful, the contracts (C) as originally created by the consumer are forwarded (4.5) to an encoder (EN). The encoder (EN) encrypts and signs the contracts (C) with the private key (priv) of the manufacturer (V) of the consumer service (CApp). The respectively associated public key (pub, 4.6) is stored in a certified authority (CA). The contracts (C) thus created are then stored (4.7) in all of the contract repositories (CR) of the network.

Figure 5:
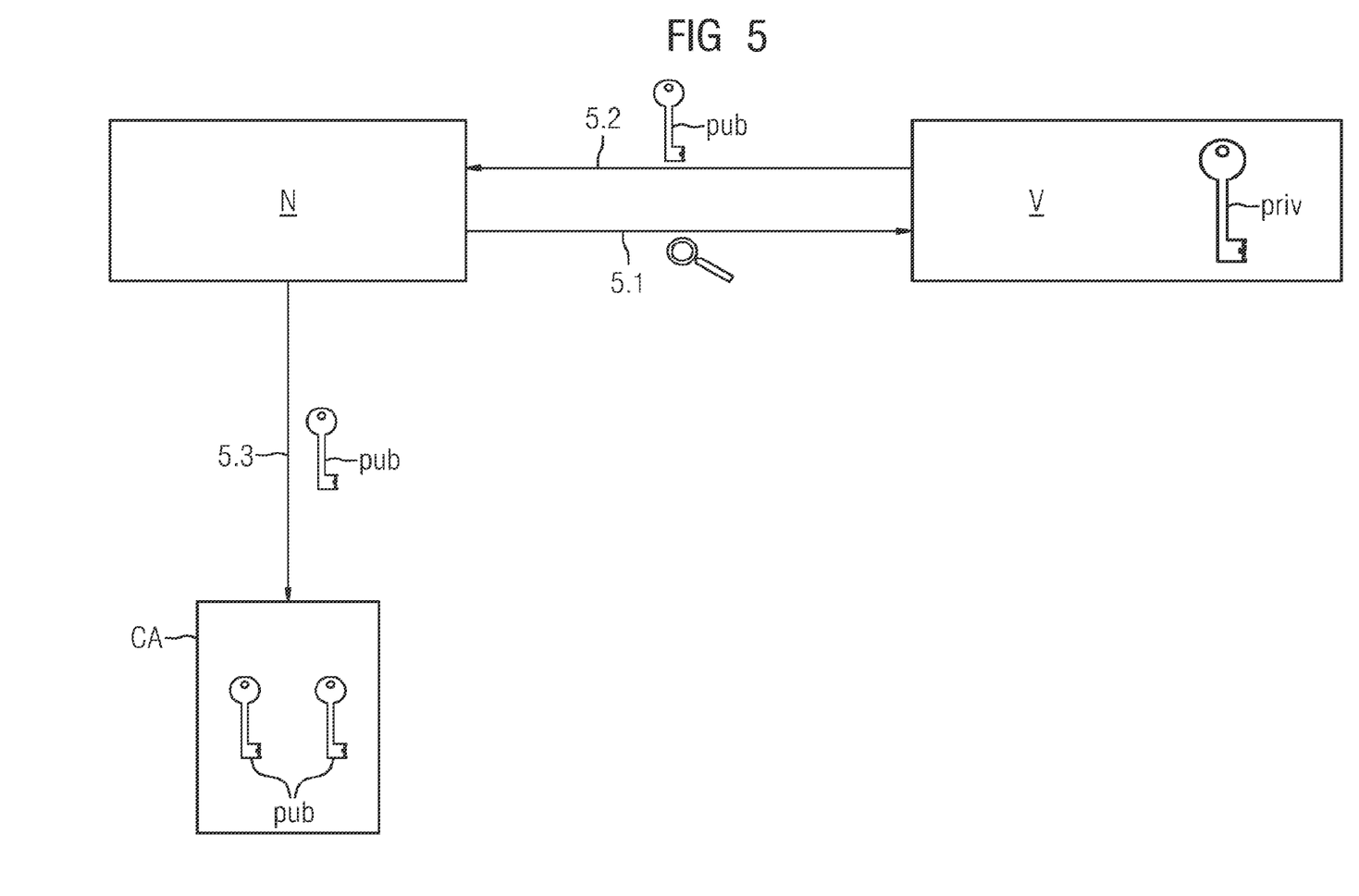
FIG. 5: Secure acceptance of new manufacturers

FIG. 5 illustrates secure acceptance of new manufacturers. The trustworthiness of a new manufacturer (V) is checked (5.1) by the network operator (N). For this purpose, the manufacturer (V) generates a key pair consisting of a private key (priv) and a public key (pub). The private key (priv) is stored internally by the manufacturer (V). The public key (pub) is transmitted (5.2) to the network operator (N). As soon as the manufacturer (V) is successfully verified in step 5.1, the network operator (N) forwards the public key (pub) to the certified authority (CA).

LIST OF REFERENCE SIGNS con consumer
pro provider
PApp provider service
CApp service of a consumer
req request
O observer/observation
cl interface, IoT/network communication layer
M matcher/comparison, comparison function
ch comparisons (checks)
res response
key key
pub public key
priv private key
CA certified authority
C contracts
CR contract repository
G response/request gate/logic gate
F forwarder
E escalator
t_b build time
t_r runtime
N network, for example IoT
Ver verification subsystem

What is claimed is:

1. A method for identifying/detecting non-qualified services in a network of distributed services, the method comprising:
    detecting comparative interaction patterns between a first service and at least one second service in a contract;
    observing interaction patterns during communication between the first service and the at least one second service;
    comparing the observed interaction patterns with the comparative interaction patterns to identify non-qualified services; and
    maintaining secrets in a securable build time environment so the secrets are not available in an open runtime environment;
    wherein the contract is generated during a build time of software of the first service and includes at least one of: an agreement, a comparison template, or a specification documenting agreed interaction patterns between the first service and the at least one second service; and
    wherein, in order to add a further service to an existing network of distributed services, the contracts relating to this further service are signed and/or cryptographically secured and made accessible to all verification subsystems of the network.

2. The method as claimed in claim 1, further comprising taking the comparative interaction patterns from required tests during a build time.

3. The method as claimed in claim 1, further comprising reporting an identified non-qualified service to an administrator and/or excluding a service detected as non-qualified from the network of distributed services.

4. The method as claimed in claim 1, wherein a service observes a communication that it maintains with another service.

5. The method as claimed in claim 4, further comprising comparing the observed communication from another service with the contract/the contract specification.

6. The method as claimed in claim 1, wherein the signature and/or cryptographic security are implemented with a private key.

7. A computer system comprising:
    an execution environment for a service of a consumer and/or provider, integrated in a network of distributed services as a certified subscriber such that the execution environment communicates with a further computer system and a memory unit;

the memory unit containing a contract repository in which contracts containing comparative interaction patterns are stored;

wherein each contract is generated during a build time of service software and includes at least one of: an agreement, a comparison template, or a specification documenting agreed interaction patterns for the service;

a data connection to an observer designed to record observation data on interaction patterns during communication with the further computer system;

a data connection to an interface via the observer;

a direct data connection to a gate via a forwarder of the gate; and an indirect data connection to the gate via the observer and a matcher or via the observer, a matcher, and the interface;

wherein the matcher requests keys required for a comparison from a certified authority in order to access signed and/or cryptographically secured contracts in the contract repository and selects, from these, contracts that match the interaction patterns of the observed communication; and wherein, in order to add a further service to an existing network of distributed services, the contracts relating to this further service are signed and/or cryptographically secured and made accessible to all verification subsystems of the network and the secrets are maintained in a securable build time environment so the secrets are not available in an open runtime environment.

8. The computer system as claimed in claim 7, wherein:
the observer, the matcher, the gate, the contract repository, and an encoder are implemented in a verification subsystem between a service and an interface.

9. A distributed network comprising:

a first certified subscriber or a first certified service of a subscriber, consumer, and/or provider;

a second certified subscriber and/or a second certified service communicating with the first service;

a memory unit storing a contract repository providing contract specifications containing comparative interaction patterns;

wherein the contract is generated during a build time of software of the first service and the specifications include at least one of: an agreement, a comparison template, or a specification documenting agreed interaction patterns between the first service and the second service;

a data connection between the first service and an observer recording observation data on interaction patterns during the communication with the second service;

a direct data connection from the first service to an interface and/or an indirect connection of the first service to an interface via the observer; and a direct data connection from the first service to a gate via a forwarder of the gate; and an indirect data connection from the first service to the gate via the observer and a matcher or via the observer, a matcher, and the interface;

wherein the matcher requests keys required for a comparison from a certified authority in order to access signed and/or cryptographically secured contracts in the contract repository and select, from these, contracts that match the interaction patterns of the observed communication; and wherein, in order to add a further service to an existing network of distributed services, the contracts relating to this further service are signed and/or cryptographically secured and made accessible to all verification subsystems of the network and the secrets are maintained in a securable build time environment so the secrets are not available in an open runtime environment.

10. The distributed network as claimed in claim 9, wherein the distributed network open to the joining of new subscribers and/or services.

11. The distributed network as claimed in claim 9, having a decentralized structure.

* * * * *